US006408573B1

(12) United States Patent
Fukumoto et al.

(10) Patent No.: US 6,408,573 B1
(45) Date of Patent: Jun. 25, 2002

(54) DRIVE DEVICE FOR VEHICULAR SLIDE DOORS

(75) Inventors: Ryoichi Fukumoto, Nagoya; Katsuhisa Yamada, Toyota; Masao Ohhashi, Kariya; Shintaro Suzuki, Kasugai, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/461,115

(22) Filed: Dec. 14, 1999

(30) Foreign Application Priority Data

Dec. 14, 1998 (JP) ............................................. 10-355198

(51) Int. Cl.[7] ................................................ E05F 11/00
(52) U.S. Cl. ...................................................... 49/360
(58) Field of Search ........................ 49/360, 362, 349, 49/279, 280; 192/140, 143

(56) References Cited

U.S. PATENT DOCUMENTS

| 5,056,633 A | | 10/1991 | Noel |
| 5,351,439 A | * | 10/1994 | Takeda et al. ............ 49/349 X |
| 5,692,410 A | | 12/1997 | Fenelon |
| 5,778,843 A | | 7/1998 | Inoue et al. |
| 5,943,913 A | | 8/1999 | Fenelon |
| 5,956,998 A | | 9/1999 | Fenelon |
| 5,982,131 A | | 11/1999 | Aino |
| 6,003,193 A | | 12/1999 | Rivin et al. |
| 6,009,671 A | * | 1/2000 | Sasaki et al. ................. 49/352 |
| 6,027,032 A | | 2/2000 | Aoki et al. |
| 6,032,415 A | * | 3/2000 | Tajima ..................... 49/348 X |
| 6,108,976 A | | 8/2000 | Kato et al. |
| 6,114,820 A | * | 9/2000 | Nishigaya ................. 49/348 X |
| 6,183,040 B1 | | 2/2001 | Imaizumi et al. |
| 6,198,242 B1 | | 3/2001 | Yokomori et al. |

FOREIGN PATENT DOCUMENTS

JP            10-266697          10/1998

* cited by examiner

*Primary Examiner*—Jerry Redman
(74) *Attorney, Agent, or Firm*—Burns, Doane, Swecker & Mathis, LLP (57) ABSTRACT

A vehicular slide door apparatus includes a slide door which is movable between an open position and a closed position, and a drive device having a shaft which couples the slide door and an electric motor. When the motor is turned on, the slide door moves. The shaft is provided with a magnetic member which is sensed while the shaft is rotating by a sensor having a Hall element. This allows a direct determination of the shaft rotation so that such determination and successive determinations of the slide door movement become as accurate and precise as possible.

14 Claims, 9 Drawing Sheets

DRIVE DEVICE FOR VEHICULAR SLIDE DOORS

This application is based on and claims priority under 35 U.S.C. § 119 with respect to Japanese Patent Application No. 10(1998)-355198 filed on Dec. 14, 1998, the entire content of which is incorporated herein by reference.

FIELD OF THE INVENTION

The present invention generally relates to a vehicle slide door. More particularly, the present invention pertains to a drive device for vehicle slide doors.

BACKGROUND OF THE INVENTION

Japanese Patent Laid-open Print No. Hei. 10-266697 discloses a drive device for a vehicle slide door that includes a shaft which is coupled to a slide door by way of a clutch mechanism. When an electric motor is turned on in one direction, the resulting rotation of the motor output shaft is transmitted to the slide door via the shaft for opening the slide door. When the electric motor is turned on in the opposite direction, the resulting rotation of the motor output shaft is transmitted to the slide door via the shaft for closing the slide door. To determine the displacement or degree of movement of the slide door, the amount of rotation of another shaft which is coupled with the shaft by way of a belt is checked.

However, the belt is formed from rubber and thus tends become loose or shrinks to some extent depending on surrounding temperature and changes in the surrounding temperature. This means that the rotation of the shaft cannot be transmitted to the other shaft with perfect precision. As a result, it may not be possible with this known drive device to correctly determine the displacement or degree of movement of the slide door.

Accordingly, a need exists for a drive device for vehicle slide doors in which the rotation of the shaft can be determined with a relatively great degree of accuracy and precision so that the position of the slide door can be accurately ascertained.

SUMMARY OF THE INVENTION

In light of the foregoing, a drive device for a vehicle slide door according to the present invention includes a shaft that is journalled in a casing, coupled to an electric driving source by way of a clutch mechanism for receiving a force, and moves the slide door by using the force, an output gear mounted on the shaft to rotate together with the shaft, a rotor accommodated in the casing and rotated together with the shaft, and a movable plate that is accommodated in the casing for rotation relative to the shaft and that is adapted to be coupled to the rotor in a detachable manner. An armature is secured to the movable plate, and an electric coil winding device is secured to the casing in opposition to the armature via the rotor. The electric coil winding device cooperates with the armature and the rotor to constitute a magnetic closed loop which attracts the armature toward the rotor to thereby couple the movable plate and the rotor. A magnetic member is secured to the rotor to be located outside the magnetic closed loop, and a sensor is secured to the casing and has a Hall element for detecting the rotation of the rotor.

The magnetic member is preferably in the form of a ring-shaped magnet whose periphery is provided with alternatively arranged N-poles and S-poles.

According to another aspect of the invention, a drive device for a vehicle slide door includes a rotatable shaft journalled in a casing and coupled to an electric driving source by way of a clutch mechanism for receiving a rotational force, an output gear mounted on the shaft for rotation together with the shaft, a cable connectable to the slide door and engaged by the output gear, a magnetic member operatively associated with the shaft so that rotation of the shaft causes rotation of the magnetic member, and a Hall element mounted in opposing relation to the magnetic member to sense rotation of the shaft.

In accordance with another aspect of the invention, a vehicle slide door apparatus includes a slide door mounted on a lateral side of a vehicle body for movement in a lengthwise direction of the vehicle body between an open position and a closed position, a connecting cable connected to the slide door to move with the slide door, and a rotatable shaft journalled in a casing, an output gear mounted on the shaft for rotation together with the shaft. The connecting cable engaged by the output gear so that the output gear and the connecting cable move together. A magnetic member is operatively associated with the shaft so that rotation of the shaft causes rotation of the magnetic member, and a sensor is mounted in opposing relation to the magnetic member to sense rotation of the shaft based on rotating movement of the magnetic member.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
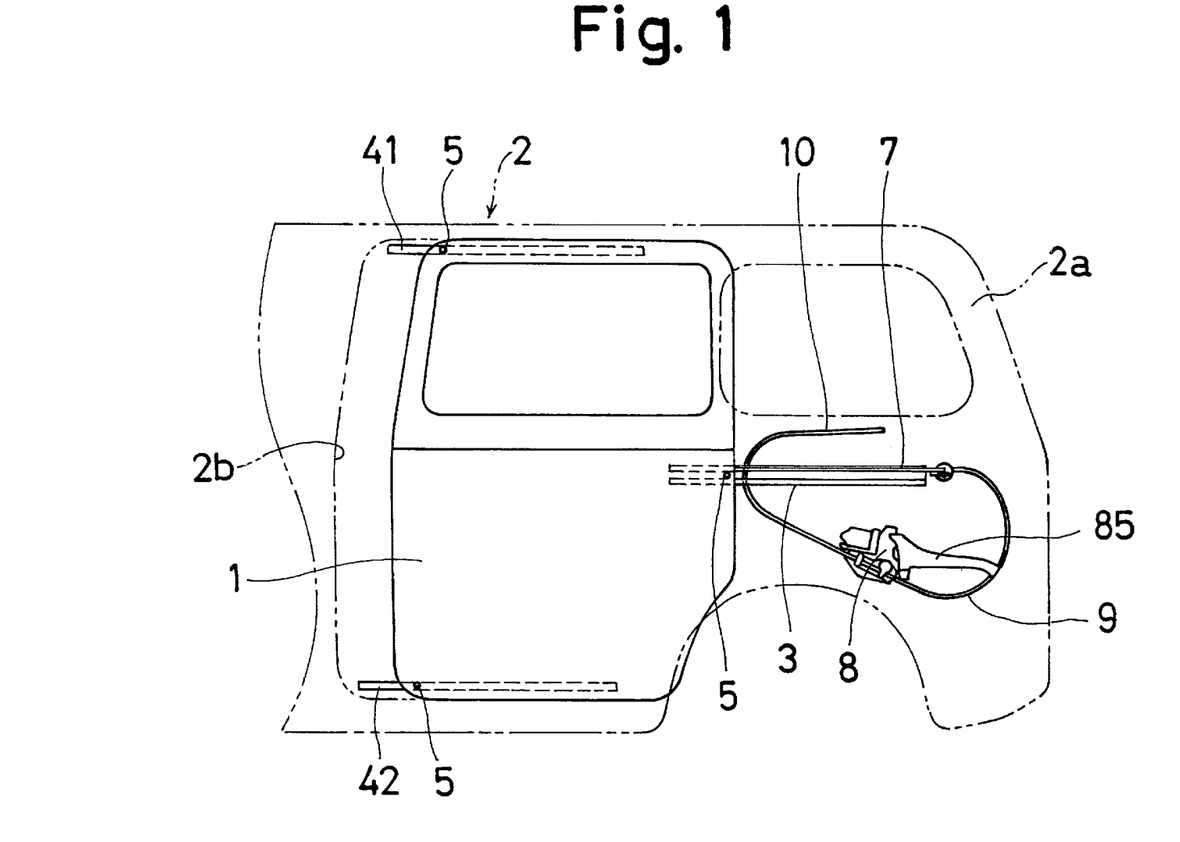
FIG. 1 is a side view of a vehicle body at which is located a slide door apparatus according to the present invention.
Figure 2:
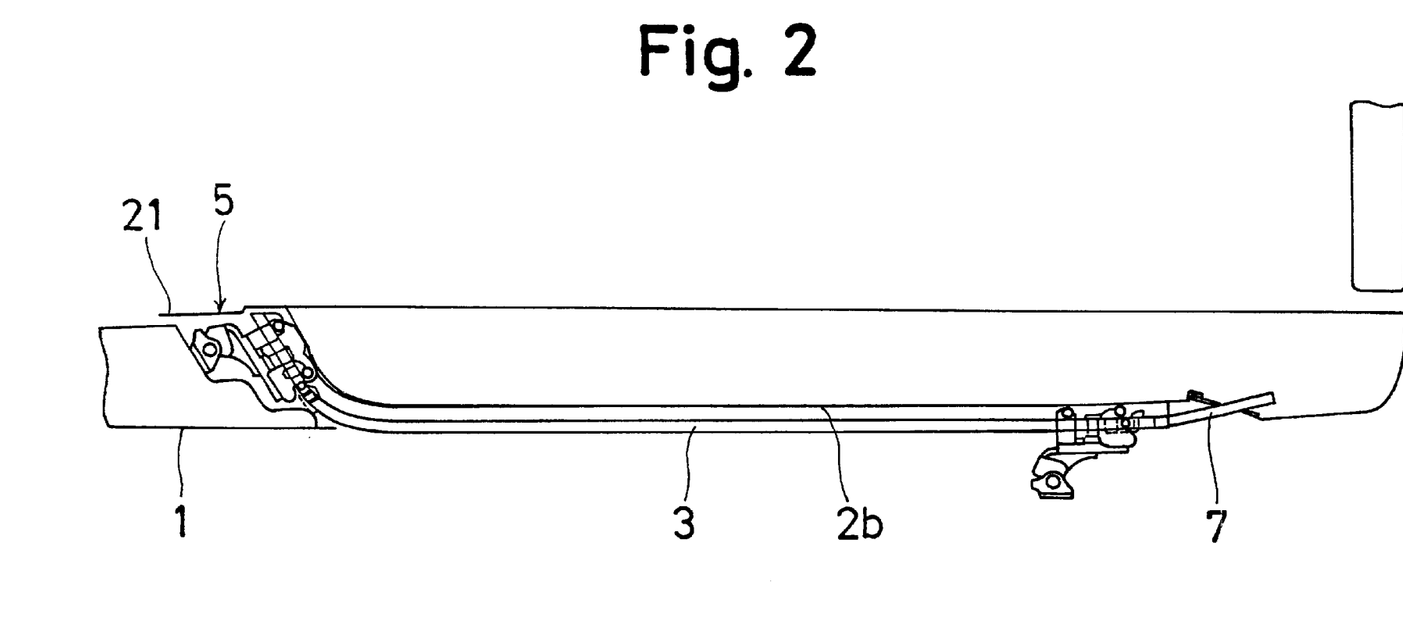
FIG. 2 is a horizontal cross-sectional view of the slide door apparatus shown in FIG. 1.

FIGS. 1 and 2 illustrate the rear portion of the vehicle body 2 of a van type vehicle. The lateral side 2a of the vehicle body 2 is provided with an opening area 2b possessing a substantially rectangular shape. The opening area 2b is adapted to be closed and opened by a slide door 1. The slide door 1 is supported by an upper guide rail 41, a lower guide rail 42 and a center guide rail 3 so as to be movable in the vehicle lengthwise direction corresponding to the right-and-left direction in FIG. 1.

The upper guide rail 41 is arranged along the upper periphery of the opening area 2b at a position closely adjacent the opening area 2a and is secured to the lateral side 20 of the vehicle body 2 by way of suitable connecting devices such as screws. The lower guide rail 42 is arranged along the lower periphery of the opening area 2b at a position closely adjacent the opening area 2a and is secured to the lateral side 2a of the vehicle body 2 by way of suitable connecting devices such as screws. The center guide rail 3 is positioned at the rear side of the opening area 2b and is secured to the lateral side 2a of the vehicle body 2 by way of suitable connecting devices such as screws.

The slide door 1 is provided with three guide roller units 5 which slidably engage the respective guide rails 3, 41, 42, thereby allowing the slide door 1 to slide along the guide rails 3, 41, 42. The guide rails 3, 41, 42 are arranged parallel to each other and extend in the vehicle lengthwise direction. For establishing a coplanar relationship between the outer surface of the slide door and the outer surface of the lateral side 2a of the vehicle body 2 when the opening area 2b is fully closed by the slide door 1, the front end of each of the guide rails 3, 41, 42 is bent toward the interior or inner space of the vehicle body 2. When the opening area 2b is fully opened, the slide door 1 is positioned at the rear side of the opening area 2b and is positioned in an overlapping or layered condition relative to the lateral side 2a of the vehicle body 2.

Figure 3:
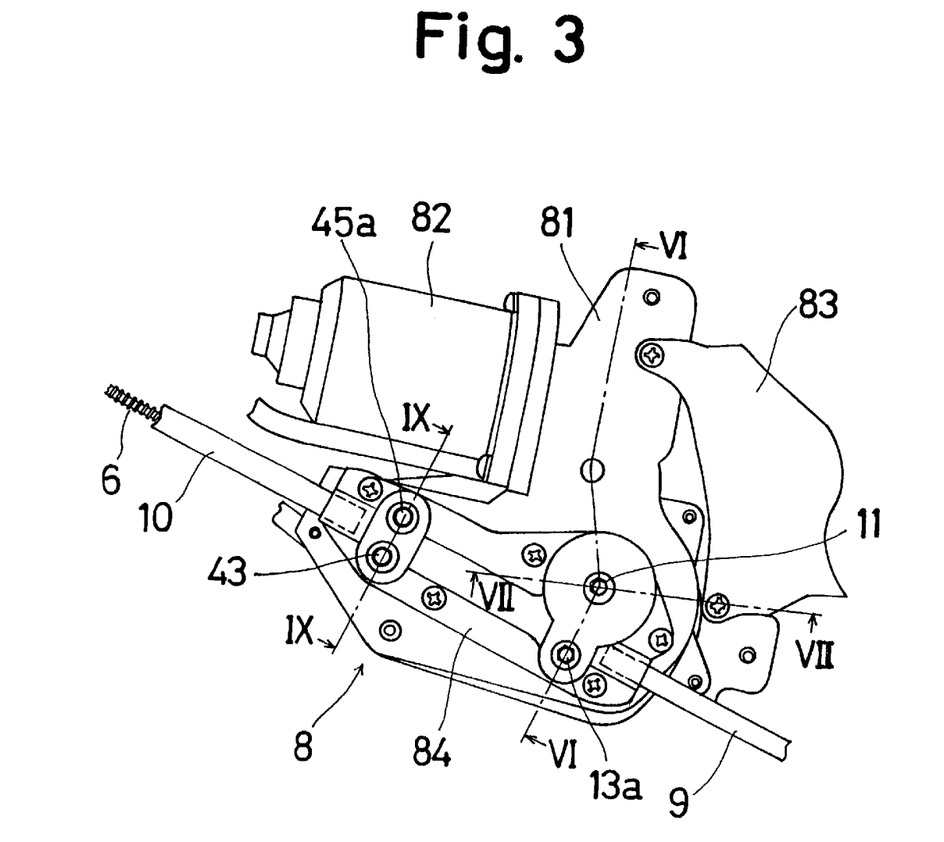
FIG. 3 is a front view of the driving device associated with the slide door apparatus shown in FIG. 1.

The roller unit 5 which slides along the center guide rail 3 is connected to one end of a geared cable 6, seen in FIG. 3, which passes through several guide pipes 7, 9, 10. The other end of the geared cable 6 forms a free end of the cable. The geared cable 6 is connected to a drive device 8, the details of which will be described below, at a position between the guide pipes 7, 9. The guide pipe 7 extends along the center guide rail 3 and is secured to the center guide rail 3. The guide pipe 9 is fixed to the inside of the vehicle body 2, with one end of the guide pipe 9 passing therethrough for being connected to the guide pipe 7 at the rear portion of the guide rail 3. The other end of the guide pipe 9 is connected to the drive device 8. The guide pipe 10 is fixed inside the vehicle body 2 and is connected to the drive device 8.

When the drive device 8 is turned on, the geared cable 6 is moved in one direction, which causes movement of the center positioned roller unit 5 along the center guide rail 3. As a result, the slide door 1 moves along the guide rails 3, 41, 42, thereby opening the opening area 2b in the lateral side 2a of the vehicle body. When the drive device 8 is operated in the opposite direction, the geared cable 6 is moved in the opposite direction, and this causes movement of the center positioned roller unit 5 along the center guide rail 3 in the opposite direction. The slide door 1 is thus moved along the guide rails 3, 41, 42, thereby closing the opening area 2b in the lateral side 2a of the vehicle body.

Referring to FIGS. 3–7, the drive device 8 includes a casing 81 and an electric motor 82 functioning as an electrical driving source. The casing 81 is fixedly mounted on a bracket 83 which is secured to the lateral side 2a of the vehicle body 2. The motor 82 is fastened to the casing 81. The casing 81 includes a first housing part 81a and a second housing part 81b which are coupled or connected with each other by way of bolts 81c. An inner space D is defined within the housing that results from connection of the two housing parts 81a, 81b. The housing 81a of the casing 8 is connected with a cover 84 by a bolt 84a, thereby defining an accommodating space E between the housing 81a and the cover 84.

A shaft 11 is journalled in the casing 81. The shaft 11 passes through the housing 81a, the inner space D, and the accommodating space E. One end portion 11a of the shaft 11 is journalled in the cover 84 via a bush 84b, while the other end portion 11b of the shaft 11 is journalled in the housing 11b via a bush 81d. A portion 11c of the shaft 11 is also journalled in the housing 81b via a bush 81e. Between the end portions 11a, 11c, the shaft 11 is provided with a portion 11e in the form of a serration which is positioned in the accommodating space E. Between the portions 11c, 11b, the shaft 11 is provided with a supporting portion 11f and a serrated portion 11g.

An output gear 12 is mounted on the serrated portion 11e of the shaft 11 so that the output gear 12 and the serrated portion 11e of the shaft 11 are rotatable together. In the accommodating space E, a driven gear 13 is rotatably supported on the housing 81a and the cover 84 via a pin 13a, and is positioned in opposition to the output gear 12. The geared cable 6 which is accommodated in the accommodating space E is in meshing engagement with both the output gear 12 and the driven gear 13.

A rotor 14 formed of a magnetic material is mounted on the serrated portion 11g of the shaft 11 so that the rotor 14 rotates together with the serrated portion 11g of the shaft 11. The upper and lower surfaces of the rotor 14 are provided with respective annular grooves 14b, 14c which communicate with each other by a plurality of circumferentially arranged arc-shaped slots 14a having a common center point. An annular geared projection 14d is formed on the upper surface of the rotor 14 and is positioned outside the groove 14c.

Figure 5:
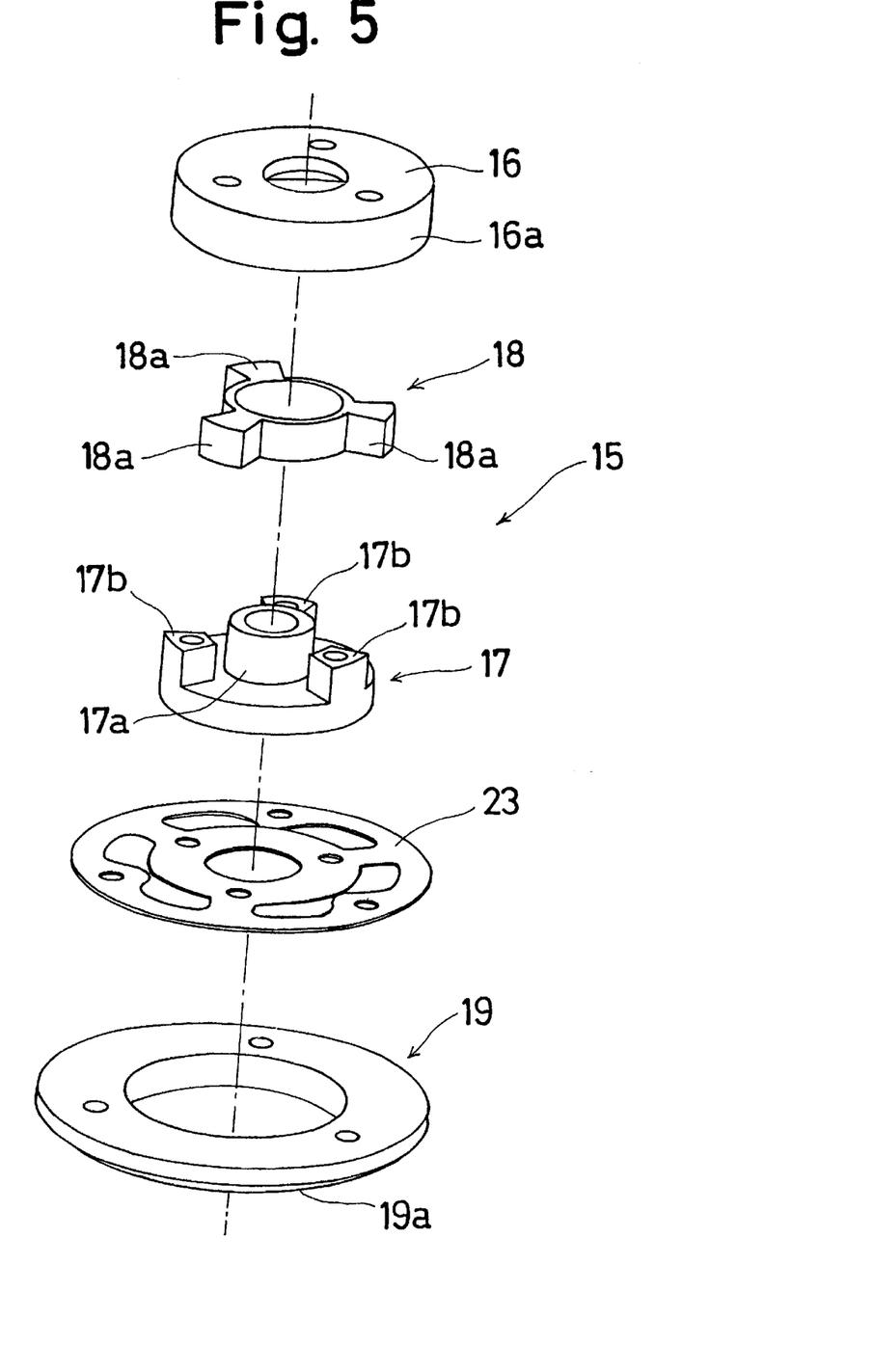
FIG. 5 is an exploded perspective view of the second disk assembly employed in the driving device shown in FIG. 3.
Figure 6:
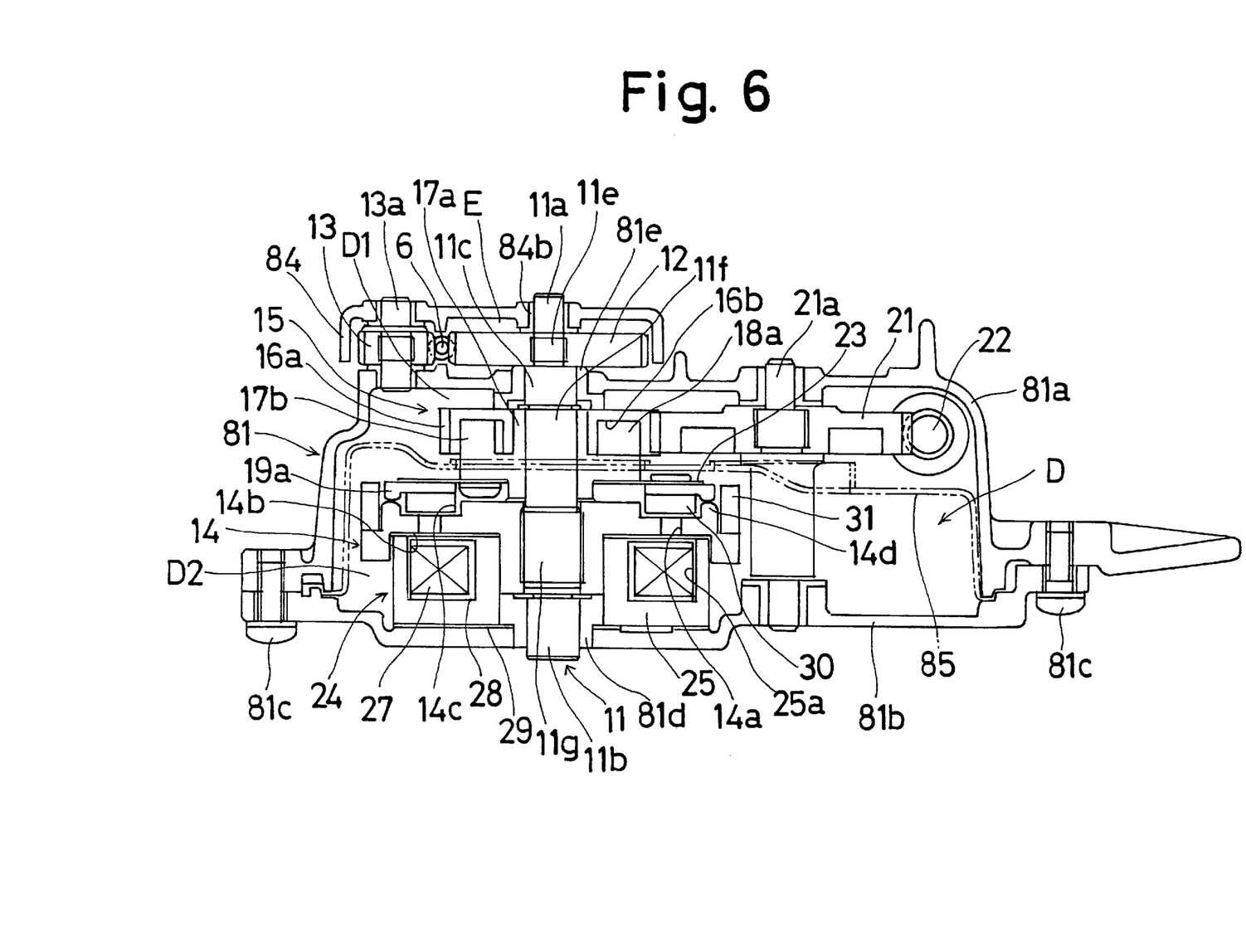
FIG. 6 is a cross-sectional view taken along the section line VI—VI in FIG. 3.
Figure 7:
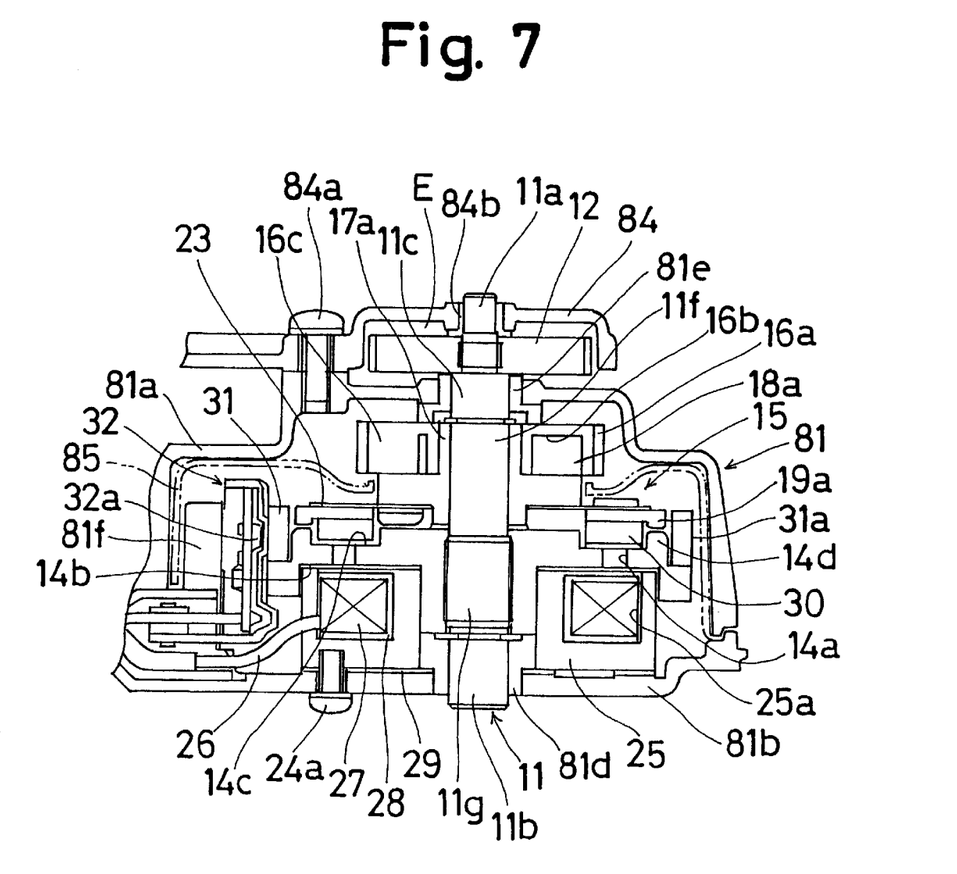
FIG. 7 is a cross-sectional view taken along the section line VII—VII in FIG. 3.

A disk assembly 15 is mounted on the supporting portion 11f of the shaft 11 so as to rotate relative to the supporting portion 11f. As best shown in FIG. 5, the disk assembly 15 includes an input wheel 16, an output wheel 17, a movable plate 19, and an elastic member 18 formed of, for example, rubber. The output wheel 17 is rotatably mounted on the supporting portion 11f of the shaft 11.

The input wheel 16 is rotatably mounted on a boss portion 17a of the output wheel 17. The outer periphery of the input wheel 16 possesses a geared configuration 16a which is in indirect meshing engagement with a worm gear 22 via an idle gear 21. The idle gear 21 is positioned in the inner space D of the casing 81 and is rotatably supported on the two housing parts 81a, 81b via a pin 21a. The worm gear 22 which is in meshing engagement with the idle gear 21 is fixedly mounted on the output shaft of the motor 82 which extends into the inner space D of the casing 81. The idle gear 21 and the worm gear 22 constitute a speed reduction gear train 20.

The input wheel 16 is provided in its lower surface with an annular groove 16b into which a plurality of projections 16c extend. The output wheel 17 is provided with equi-pitched projections 17b each of which, when fitted in the annular groove 16b in the input wheel 16, is in opposition to two adjacent projections 16c, 16c. An elastic member 18 which is accommodated in the annular groove 16b of the input wheel 16 has equi-pitched damper portions 18a each of which is positioned between two adjacent projections 16c, 17b.

The movable plate 19 is in the form of a circular plate. The upper surface of the movable plate 19 is secured to a ring-shaped leaf spring 23 by way of screws which is riveted to the output wheel 17, thus allowing the movable plate 19 to rotate together with the output wheel 17. The movable plate 19 is capable of being deformed in its axial direction, which enables the movable plate 19 to move in the axial direction. The movable plate 19 is provided at its lower surface with a ring-shaped or annular geared portion 19a.

When the electric motor 82 is turned on, the resulting rotational torque is transmitted, by way of the speed-reduction gear train 20, to the input wheel 16. The resulting rotation of the input wheel 16 is transmitted from the projections 16c of the input wheel 16 to the projections 17b of the output wheel 17 via the damper portions 18a of the elastic member 18, thereby rotating the output wheel 17. At this time, the damper portions 18a of the elastic member 18 absorb shocks to some extent which inevitably occur between the input wheel 16 and the output wheel 17.

The rotation of the output wheel 17 is transmitted by way of the leaf spring 23 to the movable plate 19. This causes rotation of the movable plate 19, thereby rotating the rotor 14 which is in meshing engagement with the movable plate 19 by engagement of the geared portion 19a of the movable plate 19 with the geared projection 14d on the rotor 14.

A ring-shaped or annular electromagnetic coil winding device 24 is accommodated within the inner space D of the casing 81 so that the electromagnetic coil winding device 24 is positioned around the shaft 11. The coil winding device 24 includes a core 25 and a coil winding 27. The core 25 is formed of a magnetic material and has an upper open-faced annular groove 25a. The coil winding 27 is supplied with electric current from an external power supply by way of a pair of harnesses 26. The coil winding 27 is formed on a bobbin 28 in winding mode and is accommodated in the annular groove 25a. The electromagnetic coil winding device 24 is positioned in the annular groove 14b of the rotor 14 and is secured to the housing 81b of the casing 81 by a plurality of bolts 24a. An anti-vibration plate 29 made of a rubber or a resin material is held between the housing 81b and the coil winding device 24.

A ring-shaped or annular armature 30 which is formed of electromagnetic material is fixedly mounted on the lower surface of the movable plate 19. The armature 30 is positioned in the annular groove 14c of the rotor 14 and is located in opposition to the electromagnetic coil winding device 24 with the rotor 14 being located between the armature 30 and the electromagnetic coil winding device 24. Positioning the electromagnetic coil winding device 24 and the armature 30 in the respective annular grooves 14b, 14c of the rotor 14 reduces the axial extent or thickness of the driving device 8, thereby establishing a thinner driving device 8.

The movable plate 19 of the disk assembly 15, the rotor 14, and the electromagnetic coil winding device 24 together constitute a clutch mechanism CL.

When the coil winding 27 of the electromagnetic coil winding device 24 is energized, a magnetite closed loop is produced which circulates through the coil winding 27, the core 25, the rotor 14, and the armature 30. This generates an electromagnetic force attracting the armature 30 toward the rotor 14. Then, the movable plate 19 is brought into axial movement toward the rotor 14 in such a manner that the movable plate 19 is increasingly deformed, which causes a meshing engagement between the geared portion 19a of the movable plate 19 and the geared portion 14a of the rotor 14. Thus, the clutch mechanism CL assumes its ON-condition which allows the rotor 14 to rotate together with the disk assembly 15. At this time, the anti-shock plate 29 decreases the shock sound which is inevitably generated upon meshing engagement between the geared portion 19a of the movable plate 19 and the geared portion 14a of the rotor 14, thereby reducing the resonance sound at the lateral side 2a of the vehicle body 2. Thus, the sound which occurs during the operation of the driving device 8 becomes reduced to a significant extent.

On the other hand, when current application to the coil winding 27 of the electromagnetic coil winding device 27 is interrupted, the foregoing attraction force disappears or is no longer present. The restoration force of the leaf spring 23 thus causes the reverse axial movement of the movable plate 19, thereby releasing the geared portion 19a of the movable plate 19 from the geared portion 14d of the rotor 14. The clutch mechanism CL thus assumes the OFF-condition under which the disk assembly 15 is able to rotate relative to the rotor 14.

An annular magnet 31 is fixedly positioned in the annular groove 14c of the rotor 14. The magnet 31 is positioned outside the magnetite closed loop which circulates through the core 25, the rotor 14, and the armature 30. Thus, the magnet 31 is not affected even when the coil winding 27 is being applied with current. Plural sets of N-pole and S-pole combinations are magnetized alternately along the entire outer periphery 31a of the magnet 31 in such a manner that the N-poles and S-poles are arranged alternately.

A door sensor 32 is provided in the casing 81 and is positioned to oppose the magnet 31. The sensor 32 includes a pair of Hall elements 32a, 32a both of which are secured to a vertical wall 81f of the housing 81b by screws. While the magnet 31 is being rotated, the Hall elements 32a, 32a issue signals, respectively, which are of a phase difference of 90 degrees. This means that the sensor 32 serves for detecting the rotational condition of the rotor 14. Such signals are fed to a CPU and are used to calculate the sliding speed of the slide door 1, the sliding direction of the slide door 1, and the current position of the slide door 1.

A divider 85 is positioned in the casing 81 such that the outer periphery of the divider 85 is held between the housings 81a, 81b. The shaft 11 passes through the divider 85. The divider 85 divides the inner space D of the casing 81 into a first inner sub-space D1 and a second inner sub-space D2. The input wheel 16 of the disk assembly 15 and the speed reduction gear train 20 are accommodated in the first inner sub-space D1, while the output wheel 17 of the disk assembly 15, the movable plate 19, the rotor 14, the electromagnetic coil winding device 24, and the sensor 32 are accommodated in the second inner sub-space D2. Due to this arrangement, the rotor 14, the movable plate 19, and the sensor 32 are not liable to be infiltrated with grease between the idle gear 21 and the input wheel 16 and with metal powder generated by the meshing engagement.

The following is a description of the operation of the driving device 8 in conjunction with slide movement of the slide door 1. To slide the slide door 1, the clutch mechanism 8 is first brought into the ON-condition under which the rotor 14 is rotatable together with the disk assembly 15 due to the fact that the geared portion 14d of the rotor 14 is in meshing engagement with the geared portion 19a of the movable plate 19 while the coil winding 27 of the coil winding device 24 is being energized. Under such a condition, if the electric motor 82 is turned on, the resulting rotation, after passing through the speed reduction gear train 20, rotates the disk assembly 15 and the rotor 14, which causes rotation of the shaft 11, thereby rotating the output gear 12. Thus, the geared cable 6 which is in meshing engagement with the output gear 12 is moved in one direction to open the slide door 1 or in the opposite direction to close the slide door 1. Establishing concurrent rotation of the rotor 14 and the disk assembly 15 causes an electrical operation of the slide door 1 under which the slide door 1 is moved by the electric motor 82. Immediately upon the slide door 1 being brought into its fully opened condition or closed condition, the current application to the coil winding 27 of the electromagnetic coil winding device 24 and the electric motor 82 is turned off.

When the clutch mechanism 8 is in the OFF-condition, the rotor 14 is rotatable relative to the disk assembly 15 due to the fact that the geared portion 14d of the rotor 14 is out of meshing engagement with the geared portion 19a of the movable plate 19 and the coil winding 27 of the coil winding device 24 is not being energized. Under such a condition, manual operation of the slide door 1 is established. That is, if the slide door 1 is moved manually in one direction to open the slide door or is moved in the opposite direction to close the slide door, the resulting movement of the geared cable 6 rotates the shaft 11 due to the fact that the geared cable 6 is in meshing engagement with the output gear 12, The rotor 14 is thus rotated. At this time, the geared portion 14d of the rotor 14 is out of meshing engagement with the geared portion 19a of the movable plate 19 and so rotation of the rotor 14 is not transmitted to the disk assembly 15.

Figure 4:
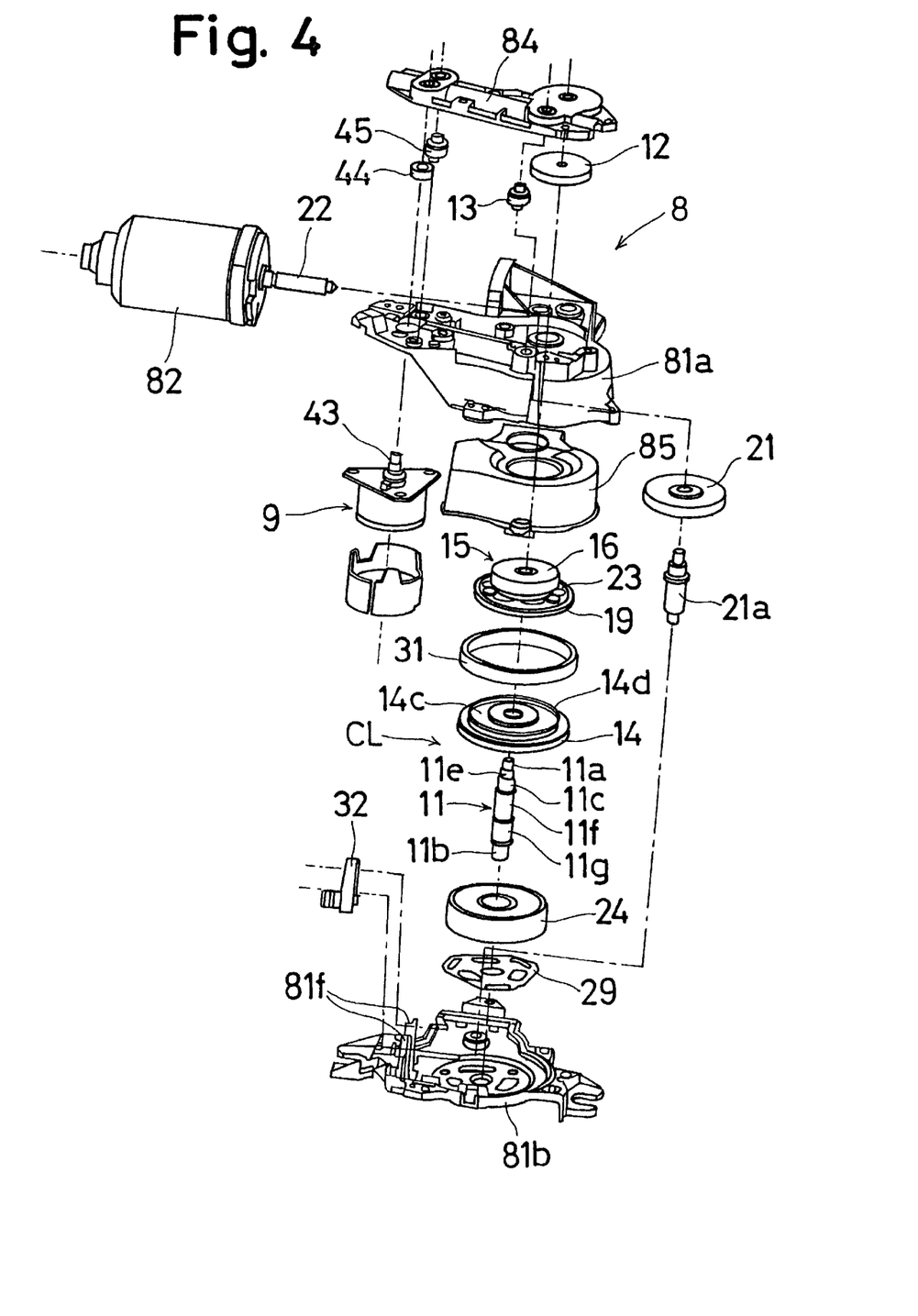
FIG. 4 is an exploded perspective view of the driving device shown in FIG. 3.

As can be understood from the illustration of FIG. 4, the clutch mechanism 8 is provided with a brake device 99.

Figure 8:
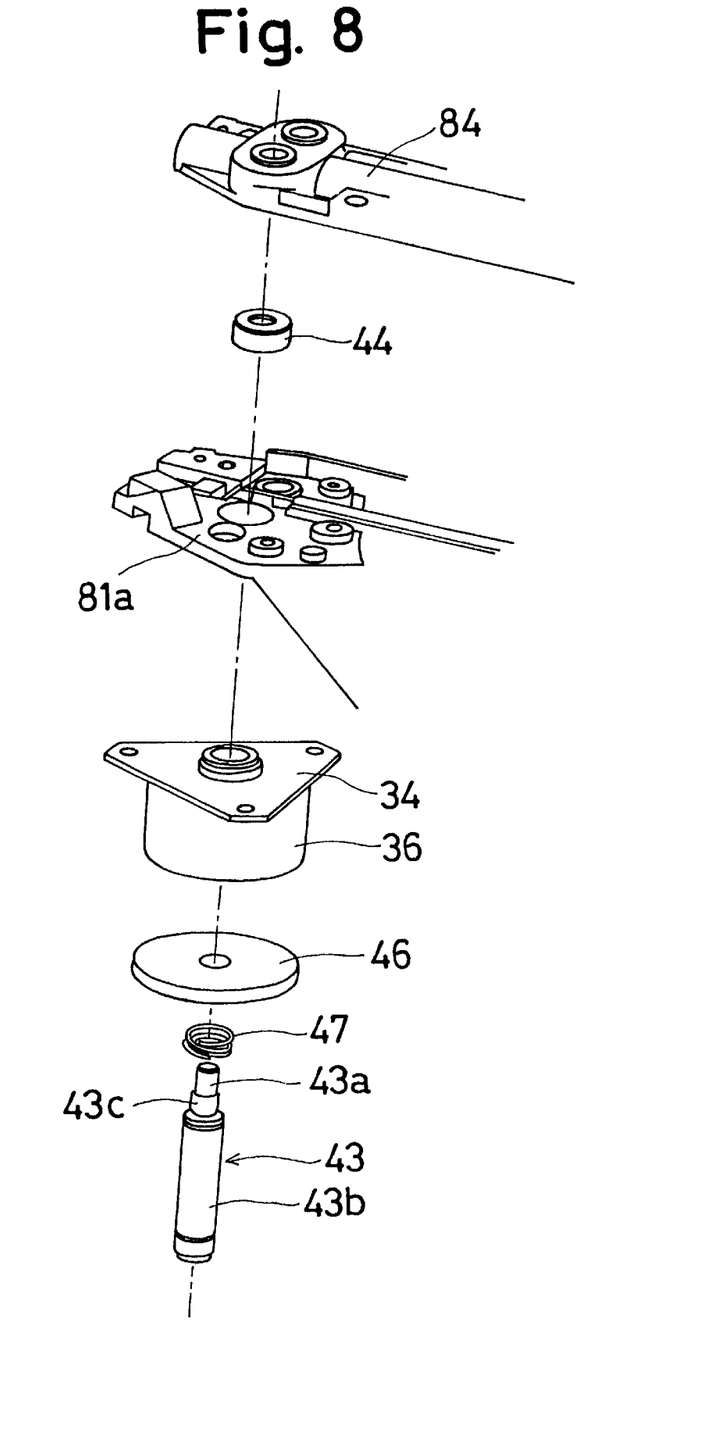
FIG. 8 is an exploded perspective view of the brake device used in conjunction with the driving device shown in FIG. 3.
Figure 9:
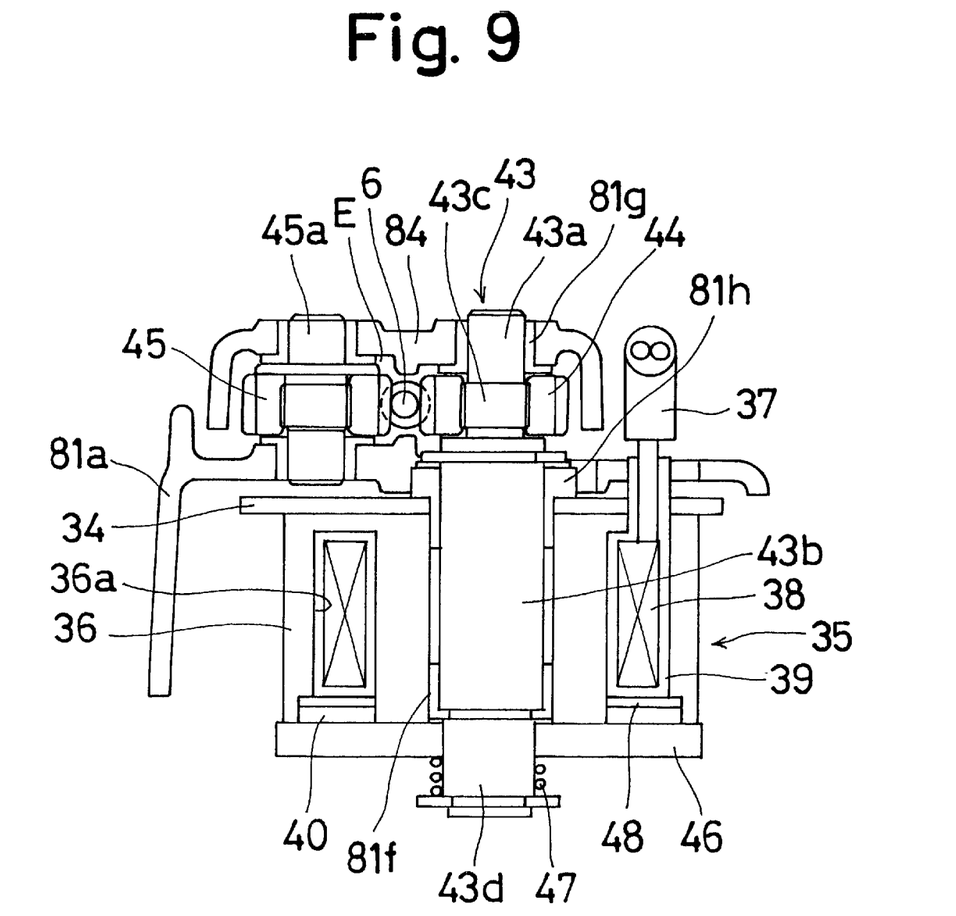
FIG. 9 is a cross-sectional view taken along the section line IX—IX in FIG. 3.

With reference to FIGS. 8 and 9, a bracket 34 is secured by bolts to the housing 81a of the casing 81. The bracket 34 is fixed with an electromagnetic coil winding device 35. The coil winding device 35 includes a core 36 and a coil winding 38. The core 36 is formed of a magnetic material and has a lower open-faced annular groove 36a. The coil winding 38 is applied with electric current from an external power supply by way of harness wires 37. The coil winding 38 is mounted on a bobbin 39 and is accommodated in the annular groove 36a. The opening of the annular groove 36a is closed by an annular metal plate 48 and a friction plate 40 in such a manner that the friction plate 40 projects slightly beyond the bottom of the core 36.

A shaft 43 is journalled in the electromagnetic coil winding device 35 via a pair of axially spaced bushes 81g, 81f. The shaft 43 is so positioned as to traverse the accommodating space E after passing through the bracket 34 and the housing 81a. One end side portion 43a of the shaft 43 is journalled in the cover 84 via a bush 81g, and an intermediate portion 43b of the shaft 43 around which the coil winding device 35 is positioned is journalled in both the bracket 34 and the housing 81a via a bush 81h. The shaft 43 is provided with a serration portion 43c between the end portion 43a and the intermediate portion 43b, and is located within the accommodating space E. The other end portion of the shaft 43 defines another serration portion 43d located adjacent or next to the intermediate portion 43b.

A brake gear 44 is mounted on the serration portion 43c of the shaft 43 and is thus rotated together with the serration portion 43c. A driven gear 45 is positioned in the accommodating space E. The driven gear 45 is fixedly mounted on a pin 45a whose opposite end portions are journalled in the housing 81 and the cover 84 respectively. The driven gear 45 is positioned in opposition to the brake gear 44. The brake gear 45 is in indirect meshing engagement with the driven gear 44 via the geared cable 6 which extends through the accommodating space E.

An armature 46 is mounted on the serration portion 43d of the shaft 43 so that the armature is movable along the serration portion 43d of the shaft 43 and is rotatable together with the serration portion 43d of the shaft 43. The armature 46 is formed of a magnetic material and is configured as a circular plate.

The armature 46 is urged continually by a spring 47 that is arranged around the shaft 43 so that the armature 46 is in slight face-to-face contact with the friction plate 40.

In the foregoing structure, if the coil winding 38 of the coil winding device 35 is energized, a magnetic closed loop is formed which passes through the coil winding 38, the core 36, and the armature 46, thereby generating an electromagnetic force which attracts the armature toward the rotor 36. Thus, the armature 46 moves along the shaft 43 toward the rotor 36, with the result that the armature 46 is strongly brought into engagement with the friction plate 40. This thus results in a large friction force being applied as a brake force to the armature 46 under rotation.

On the other hand, if the coil winding 38 of the coil winding device 35 is de-energized, there is no magnetic attraction force attracting the armature toward the rotor 36 and so the armature 46 is able to rotate freely relative to the friction plate 40. The reason is that between the friction plate 40 and the armature 46 under rotation, there is only a very small amount of friction force braking the friction plate 40.

The operation of the brake device 99 in conjunction with the movement of the slide door 1 is as follows. While the slide door 1 is moving, the geared cable 6 is also moving in one direction (or the other direction), and the meshing engagement between the geared cable 6 and the brake gear 44 causes the brake gear 44, the shaft 43, and the armature 46 to rotate.

When the slide door 1 is moving by virtue of either the driving operation of the driving device 8, manual operation, or gravity unexpectedly applied to the slide door 1 when the vehicle is parked on a slanted or sloping road, the CPU calculates the sliding speed of the slide door 1 on the basis of the signals issued from the sensor 32. If the detected sliding speed of the slide door 1 exceeds a predetermined value, the coil winding 38 of the coil winding device 35 is energized, and an immediate and strong engagement of the armature 46 with the friction plate 40 occurs, thereby generating a very large friction force between the armature 46 and the friction plate 40. Thus, with little time lag, a braking force is applied to the slide door 1.

The foregoing operation of the brake device 99 is under the control of the CPU. The control allows the operator to move the slide door 1 in a smooth manner when the slide door 1 is moved in the manual mode.

In addition, in the case where no driving device 8 is provided to the vehicle, the brake device 99 can be applied thereto. That is, solely the brake device 99 can be employed. In this structure, the magnet 31 is positioned on the armature 46 and the sensor 32 opposing thereto detects the rotational condition of the armature 46 for determining the sliding speed, the sliding direction, and the current position of the slide door 1.

In accordance with the present invention, the shaft is provided with a magnetic member which, while the shaft is rotating, is sensed by a sensor having a Hall element. This allows a direct determination of rotation of the shaft to be made. This determination and the successive or resulting determination of the slide door position is quite accurate and precise.

Mounting the magnetic member on the rotor allows a radial extension of the magnetic member, thereby improving the resolution of the rotor. Thus, the detection of the rotation of the shaft can be made with a high degree of accuracy and precision.

The principles, preferred embodiments and modes of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A drive device for a vehicular slide door comprising:
   a shaft journaled in a casing and coupled to an electric driving source by way of a clutch mechanism for receiving a force to move the slide door;
   an output gear mounted on the shaft for rotation together with the shaft;
   a rotor accommodated in the casing and rotated together with the shaft;
   a movable plate accommodated in the casing, rotatable relative to the shaft and adapted to be coupled to the rotor in a detachable manner;
   an armature secured to the movable plate;
   an electric coil winding device secured to the casing in opposition to the armature via the rotor and cooperating with the armature and the rotor to constitute a magnetic closed loop which attracts the armature toward the rotor to thereby couple the movable plate and the rotor;
   a magnetic member secured to the rotor at a position outside the magnetic closed loop; and
   a sensor secured to the casing and provided with a Hall element for detecting rotation of the rotor.

2. The drive device for a vehicular slide door as set forth in claim 1, wherein the magnetic member is a ring-shaped magnet having a periphery provided with alternately arranged N-poles and S-poles.

3. The drive device for a vehicular slide door as set forth in claim 1, wherein said electric coil winding device includes a core and a coil winding.

4. The drive device for a vehicular slide door as set forth in claim 3, wherein said core is formed of magnetic material and is provided with a groove in which is positioned the coil winding.

5. The drive device for a vehicular slide door as set forth in claim 1, wherein said electric coil winding device is positioned in an annular groove formed in the rotor.

6. The drive device for a vehicular slide door as set forth in claim 1, wherein said magnetic member is positioned in an annular groove formed in the rotor.

7. A drive device for a vehicular slide door comprising:
   a rotatable shaft journalled in a casing and coupled to an electric driving source by way of a clutch mechanism for receiving a rotational force;
   an output member mounted on the shaft for rotation together with the shaft;
   a cable connectable to the slide door and engaged by the output member;
   a magnetic member operatively associated with the shaft so that rotation of the shaft causes rotation of the magnetic member;
   a Hall element mounted in opposing relation to the magnetic member to sense rotation of the shaft;
   the clutch mechanism including a rotor mounted on the shaft and a movable plate, the magnetic member being secured to the rotor; and
   the movable plate being mounted on the shaft and rotatable relative to the shaft.

8. The drive device for a vehicular slide door as set forth in claim 7, including an armature secured to the movable plate, the clutch mechanism also including an electric coil winding device mounted on the rotor and positioned in opposition to the armature, said electric coil winding device cooperating with the armature and the rotor to constitute a magnetic closed loop which attracts the armature toward the rotor to thereby couple the movable plate and the rotor.

9. A vehicular slide door apparatus comprising:
   a slide door mounted on a lateral side of a vehicle body for movement in a lengthwise direction of the vehicle body between an open position and a closed position;
   a connecting cable connected to the slide door to move with the slide door;
   a rotatable shaft journalled in a casing and coupled to an electric driving source by way of a clutch mechanism for receiving a rotational force;
   an output member mounted on the shaft for rotation together with the shaft, said connecting cable being engaged by the output member so that rotation of said output member causes movement of said connecting cable;
   a magnetic member operatively associated with the shaft so that rotation of the shaft causes rotation of the magnetic member;
   a sensor mounted in opposing relation to the magnetic member to sense rotation of the shaft based on rotating movement of the magnetic member;
   the clutch mechanism including a rotor accommodated in the casing and mounted on the shaft to rotate together with the shaft and a movable plate accommodated in the casing, the movable plate being mounted on the shaft and rotatable relative to the shaft.

10. The vehicular slide door apparatus according to claim 9, including an armature secured to the movable plate, the clutch mechanism also including an electric coil winding device secured to the casing in opposition to the armature and cooperating with the armature and the rotor to constitute a magnetic closed loop which attracts the armature toward the rotor to couple the movable plate and the rotor.

11. The vehicular slide door apparatus according to claim 10, wherein said magnetic member is secured to the rotor at a position outside the magnetic closed loop, and the sensor includes a Hall element for detecting rotation of the rotor.

12. The vehicular slide door apparatus according to claim 10, wherein said electric coil winding device includes a core and a coil winding.

13. The vehicular slide door apparatus according to claim 12, wherein said core is formed of magnetic material and is provided with a groove in which is positioned the coil winding.

14. The vehicular slide door apparatus according to claim 9, wherein the magnetic member is a ring-shaped magnet having a periphery provided with alternately arranged N-poles and S-poles.

* * * * *